(12) United States Patent
Baker et al.

(10) Patent No.: US 7,945,238 B2
(45) Date of Patent: May 17, 2011

(54) SYSTEM AND METHODS FOR MANAGING THE UTILIZATION OF A COMMUNICATIONS DEVICE

(75) Inventors: Matthew Donald Baker, Potomac, MD (US); Steven Ira Geller, Rockville, MD (US); Douglas Owen Kesser, Little Silver, NJ (US); Daniel John Neal, Chevy Chase, MD (US); Carol Ann Politi, Bethesda, MD (US); Ben Julian Weintraub, Vienna, VA (US)

(73) Assignee: Kajeet, Inc., Bethesda, MD (US)

( * ) Notice: Subject to any disclaimer, the term of this patent is extended or adjusted under 35 U.S.C. 154(b) by 909 days.

(21) Appl. No.: 11/824,336

(22) Filed: Jun. 28, 2007

(65) Prior Publication Data

US 2009/0005000 A1    Jan. 1, 2009

(51) Int. Cl.
H04M 11/00 (2006.01)

(52) U.S. Cl. .............. 455/405; 455/407; 705/52; 705/53

(58) Field of Classification Search .......... 455/405–408, 455/410, 411; 705/52, 53
See application file for complete search history.

(56) References Cited

U.S. PATENT DOCUMENTS

| | | | |
|---|---|---|---|
| 5,221,838 | A | 6/1993 | Gutman et al. |
| 5,285,382 | A | 2/1994 | Muehlberger et al. |
| 5,704,046 | A | 12/1997 | Hogan |
| 6,018,724 | A | 1/2000 | Arent |
| 6,205,436 | B1 | 3/2001 | Rosen |
| 6,345,263 | B1 | 2/2002 | Matsumoto et al. |
| 6,885,877 | B1 | 4/2005 | Ozaki et al. |

(Continued)

FOREIGN PATENT DOCUMENTS

AU    2006100397 A4    3/2007

(Continued)

OTHER PUBLICATIONS

Mjolsnes et al., "On-line E-Wallet System with Decentralized Credential Keepers", Mobile Networks and Applications 8, pp. 87-99, published by Kluwer Academic Publishers, 2003.

(Continued)

*Primary Examiner* — Temica M Beamer
(74) *Attorney, Agent, or Firm* — SilverSky Group LLC

(57) ABSTRACT

A system and method for the real-time management of a device, and more particularly to the allocation of electronic wallets that are associated with one or more devices and various controls that enable at least two entities to manage how the device is utilized for various activities and to pay for goods and services. Each device is associated with at least two electronic wallets, a user wallet and an administrator wallet. The administrator can establish rules that designate how and when the device can be used and which wallet will be used to pay for goods and services desired by the user, but in the event the user wallet is depleted or low on funds, the administrator wallet can serve as a backup funding source for specified types of goods and/or services. Additional wallets can also be associated with the device to authorize and pay for goods and services, under the control of the administrator wallet, such as a promotional wallet that could be designated for use with the device before a primary or administrative wallet was used, or a dynamic wallet that could be associated for use with multiple different devices as well as other wallets, but acts in conjunction with the user and administrator wallets. Additional rules can be established to perform many other functions, such as manage the movement of value between wallets and from other sources to the wallets.

32 Claims, 4 Drawing Sheets

U.S. PATENT DOCUMENTS

| | | |
|---|---|---|
| 6,957,058 B2 | 10/2005 | Chan et al. |
| 6,990,182 B2 | 1/2006 | Nelson |
| 7,024,390 B1 | 4/2006 | Mori et al. |
| 7,133,846 B1 | 11/2006 | Ginter et al. |
| 7,155,411 B1 | 12/2006 | Blinn et al. |
| 7,330,717 B2 | 2/2008 | Gidron et al. |
| 2001/0007983 A1 | 7/2001 | Lee |
| 2001/0011250 A1 | 8/2001 | Paltenghe et al. |
| 2002/0022472 A1 | 2/2002 | Watler et al. |
| 2002/0179704 A1 | 12/2002 | Deaton |
| 2002/0187772 A1 | 12/2002 | Hyyppa et al. |
| 2003/0026404 A1 | 2/2003 | Joyce et al. |
| 2003/0055785 A1 | 3/2003 | Lahiri |
| 2004/0143550 A1 | 7/2004 | Creamer et al. |
| 2004/0229600 A1 | 11/2004 | Saez et al. |
| 2005/0216424 A1 | 9/2005 | Gandre et al. |
| 2007/0003034 A1 | 1/2007 | Schultz et al. |
| 2007/0058812 A1 | 3/2007 | Ali et al. |
| 2007/0060100 A1 | 3/2007 | Watler et al. |
| 2007/0095892 A1 | 5/2007 | Lyons et al. |
| 2007/0125840 A1 | 6/2007 | Law et al. |
| 2007/0198432 A1 | 8/2007 | Pitroda et al. |
| 2008/0033880 A1 | 2/2008 | Fiebiger et al. |

FOREIGN PATENT DOCUMENTS

| | | |
|---|---|---|
| EP | 0137884 A1 | 7/1983 |
| EP | 0172670 A2 | 2/1986 |
| EP | 1041520 A2 | 4/2000 |
| EP | 1528513 A1 | 4/2005 |
| EP | 1798659 A1 | 6/2007 |
| FR | 2863088 B2 | 3/2005 |
| JP | 59-062976 | 10/1984 |
| JP | 59062976 A | 10/1984 |
| JP | 9-179921 A | 7/1997 |
| JP | 9-185658 A | 7/1997 |
| JP | 12-251154 A | 9/2000 |
| JP | 12-331100 A | 11/2000 |
| JP | 13-134689 A | 5/2001 |
| JP | 13-291039 A | 10/2001 |
| JP | 16-102726 A | 4/2004 |
| JP | 18-139433 A | 6/2006 |
| JP | 18-309786 A | 11/2006 |
| JP | 19-323337 A | 12/2007 |
| KR | 2001088369 A | 9/2001 |
| KR | 2002010160 A | 2/2002 |
| KR | 2002016161 A | 3/2002 |
| KR | 2003044475 A | 6/2003 |
| KR | 20040089144 A | 10/2004 |
| KR | 2005048166 A | 5/2005 |
| KR | 2007018329 A | 2/2007 |
| WO | WO20084989 A2 | 10/2002 |
| WO | WO03092348 A2 | 11/2003 |

OTHER PUBLICATIONS

Leung et al., "On Designing a Flexible E-Payment System with Fraud Detection Capability", Proceedings of the IEEE International Conference on E-Commerce Technology 2004, 0-7695-2098-7/04.

Ebringer et al., "Parasitic Authentication to Protect Your E-Wallet", IEEE Computer Oct. 2000, pp. 54-60, 0018-9162/00.

Boyd, "Here Comes The Wallet Phone", IEEE Spectrum Nov. 2005, pp. 12-14, www.spectrum.ieee.org.

Tang et al., "Distributed Family Wallet Architecture and Secure Inter-Purse Operations", IEEE 2000, pp. 110-111, 0-7803-6301-9/00.

Pierce et al., "RF Wallet With Fraud Protection", IP.com, #IPCOM000009305D, originally published Jun. 1, 1999, IP.com published Aug. 15, 2002.

Carstens, "Mechanisms for Compiling Payment Information on Mobile Terminals", IP.com, #IPCOM000124834D, originally published Jun. 20, 2005, IP.com published Jun. 20, 2005.

IBM TDB, "Micropayment Scheme", IP.com, #IPCOM000013249D, originally published Apr. 1, 2001, IP.com published Jun. 18, 2003.

Labrou et al., "Wireless Wallet", Proceedings of the First Annual International Conference on Mobile and Ubiquitous Systems: Networking and Services-2004.

Yang et al., "A Three—Party Authenticated Key Exchange Scheme Smartcard using Elliptic Curve Cryptosystem for Secure Key Exchange in Wireless Sensor Network", IEEE 2007.

Hung et al., "Security and Privacy Aspects of SmartFlow Internet Payment System", IEEE 1999.

Raposo et al., "A Web Agent for Automating E-Commerce Operations", Proceedings of the IEEE International Conference on E-Commerce 2003.

Me al., "EC-Pay: An Efficient and Secure ECC-based Wireless Local Payment Scheme", Proceedings of the Third International Conference on Information Technology and Applications 2005.

Daniel's Wallet
You have $70.53 in your wallet
Refill / See Activity
Learn about my wallet

ACCOUNT OVERVIEW

Eleanor
301-XXX-XXXX
Wallet Balance: $0.00
Log in as Eleanor

Low Balance Alert!
Refill now
Set up auto refill

Ryan
240-XXX-XXXX
Wallet Balance: $13.76
Log in as Ryan

Steve
775-XXX-XXXX
Wallet Balance: $29.95
Log in as Steve

See all accounts 30
32
34

---

CONTACT MANAGER
Use the Contact Manager to:
Allow or block calls and text messages from specific phone numbers. Tell me more
Decide whose wallet pays for specific calls and text messages. Tell me more

Steve's Contacts            Steve

| Contact | | | Allow Calls/Texts? | | Override Restrictions | Who Pays? | | |
|---|---|---|---|---|---|---|---|---|
| Update | Name | Number | Yes | No | | Admin Wallet | Steve Wallet | Grandma Wallet |
| Edit Remove | jack | 301-555-5555 | ● | ○ | ● | ● | ○ | ○ |
| Edit Remove | jeff | 240-555-5555 | ● | ○ | ○ | ○ | ● | ○ |
| Edit Remove | All Other Numbers | | ○ | ● | ○ | ○ | ○ | ○ |
| Edit Remove | jane | 202-555-5555 | ● | ○ | ○ | ○ | ○ | ● |

Save settings              Add new contacts

| ● | 911 Calls | 911 | Emergency calls to 911 are always free. |
| ● | Customer Care | 866-4kajeet | Calls to kajeet care are always free. |
| ● | 900-# Calls | 900-XXX-XXXX | 900-number calls are always blocked. |

Give the gift of a wallet refill

Anyone with a kajeet phone would love to receive a refill as a gift, so you've come to the right place!

All about your generous gift:

Refill a wallet associated with your account

Enter the number of the kajeet phone you're gifting with a refill:
_____

How much are you sending as a gift:
_____

The lucky recipient of this gift will want to know who sent it, so enter your name in the space below:
_____

Enter a message in the space below for the recipient:
_____

Please review all information carefully before clicking "Buy Now".

CANCEL                    BUY NOW

60

Payment Information

Your email address:
_____

Select a payment option:
_____

Enter card number:
_____

Expiration date:
_____

Security code:
_____

First name of cardholder:
_____

Last name of cardholder:
_____

Address:
_____

City:
_____

State:
_____

Postal code:
_____

SYSTEM AND METHODS FOR MANAGING THE UTILIZATION OF A COMMUNICATIONS DEVICE

BRIEF DESCRIPTION OF THE INVENTION

The present invention is directed to the real-time management of a device, and more particularly to the allocation of electronic wallets that are associated with one or more devices and various controls that enable at least two entities to manage how the device is utilized for various activities and to pay for goods and services. Each device is associated with at least two electronic wallets, a user wallet and an administrator wallet. The administrator can establish rules that designate how and when the device can be used and which wallet will be used to pay for goods and services desired by the user, but in the event the user wallet is depleted or low on funds, the administrator wallet can serve as a backup funding source for specified types of goods and/or services. Additional wallets can also be associated with the device to authorize and pay for goods and services, under the control of the administrator wallet, such as a promotional wallet that could be designated for use with the device before a primary or administrative wallet was used, or a dynamic wallet that could be associated for use with multiple different devices as well as other wallets, but acts in conjunction with the user and administrator wallets. Additional rules can be established to perform many other functions, such as manage the movement of value between wallets and from other sources to the wallets.

CROSS-REFERENCES TO RELATED APPLICATIONS

Not Applicable.

STATEMENT AS TO THE RIGHTS TO INVENTIONS MADE UNDER FEDERALLY SPONSORED RESEARCH OR DEVELOPMENT

Not Applicable.

REFERENCE TO A "SEQUENCE LISTING," A TABLE, OR A COMPUTER PROGRAM LISTING APPENDIX SUBMITTED ON A COMPACT DISK

Not Applicable.

BACKGROUND OF THE INVENTION

Postpaid cellular phone (cell phone) services typically allow the user of a cell phone to spend unlimited amounts of money for services. In other words, there is nothing to stop the user from running up a huge cell phone bill. Many parents have experienced this issue with their children, prompting the parents to take their children's phones away or to otherwise restrict their children's access to the phones. Unfortunately, modern society requires that parents have the ability to contact their children by cell phone and vice versa, so the cell phones are often returned to the children despite the possibility of future abuse.

The same type of issue exists between employers and employees and other parties in similar administrator/user relationships with respect to the use/abuse of cell phones and other devices. For example, an employer may want an employee to have a communications or mobile computing device, but may not want to pay for certain services or applications that the employee can access with the device. Likewise, a government agency or school might be willing to pay for or subsidize certain communications services or applications, but not others. Without the ability to somehow restrict the employee's ability to use services or applications that the employer does not want to pay for or to shift payment obligations for those services or applications to the employee, many employers are forced to give their employees the devices anyway and hope for the best.

One partial solution to the problems associated with postpaid cellular phone abuse is the prepaid cellular phone. Prepaid phone services limit spending because the user of the phone can only use what has been paid for in advance. Many children, however, are not responsible or mature enough to adequately track and maintain their prepaid phone service accounts, and many parents have too many other obligations to keep close track of their children's cell phone use, so as to make sure the phone service accounts are adequately funded all of the time. The net result can be disastrous. For example, if a child uses up all of the funds in their prepaid account, and their phone service provider shuts down access to its services, the child will not be able to call a parent in the event of an emergency, or arrange to be picked up after school or a sporting event, etc.

Thus, a prepaid phone service does not solve the problem of ensuring availability of key services even if the prepaid account has run out of money. In addition to insuring the safety of their children, many parents would like to be able to exercise administrative control over the services and activities that a child is allowed to pay for out of their prepaid account, but prepaid accounts are not structured to provide such administrative control.

Prior attempts by prepaid service providers to address these problems have only resulted in partial solutions. Some service providers have provided for rollover usage minutes, which are minutes that were not used as part of a user's service plan and are allowed to roll over to the same user for use in the next month. In some cases, this might prevent a user from running out of minutes in the next month, but it does not guarantee that the user will not use up all of their monthly minutes, plus the rollover minutes, and be denied access to key services anyway. Other service providers have provided an automated refill service, which automatically bills some amount to a credit card to recharge the user's prepaid account in the event the balance in the user's account gets too low. However, a prepaid phone service with an automated refill service is the equivalent of a postpaid phone service and would therefore have the same problem with potential abuse as a postpaid service. In other words, there is no spending limit on the phone service.

Postpaid services have also attempted to address these problems by offering users unlimited usage packages that limit a user's exposure to running up charges. However, for parents who are also interested in preventing their children from sending 300 text messages per day with their phone, or running up a huge bill for services that are not included in the "unlimited usage package," such as downloaded games or ringtones, unlimited usage offerings are not a complete solution. Another partial solution is to provide the administrator (parent) with an alert when a user has reached some limit for a service. For example, a parent could be alerted when a child has spent more than $10 on text messages within a certain period of time. An alert, however, does not actually limit usage of the service, it just warns the parent that the limit has been reached, at which point the parent has to intervene to prevent further abuse, such as by taking the phone away from the child, which is one of the problems with postpaid services in the first place.

It is further known in the art to provide an account for a user of a prepaid phone, such as a cellular phone, in which funds are stored electronically for future use of the phone. For example, a service provider could establish an account for a user, in which funds can be stored, such as through use of a credit card charge or electronic transfer from a bank account. In some cases, corporate customers with multiple users under the same service provider might be able to have a single account for their business, with subaccounts assigned to certain phones and charged to the particular departments within the corporation to which the employees using those phones correspond. Some service providers also provide affinity accounts, which include special rates and promotions for groups of people belonging to a similar business, club, etc. In each case, however, these accounts operate separate from one another in that all of the charges for a particular phone are charged to a particular account, rather than some charges being billed to one account while other charges are billed to another account. The same is true with respect to discounts and promotions, i.e., a discount or promotion is either applied to an existing account or it is not.

Finally, it is further known to establish some measure of parental control over an account. The Telcordia™ Converged Real-Time Charging system allows users to place limited real-time controls over prepaid and postpaid accounts. For example, when an account allows a child to download premium data (data for which a charge is imposed), parental controls over that account can be set to limit that child's spending within a set of parameters. This system and other solutions, however, are only partial solutions to the problem of providing limits on overspending and other activities by the user while simultaneously assuring that the user will always be able to use the phone when appropriately needed.

BRIEF DESCRIPTION OF THE SEVERAL VIEWS OF THE DRAWING

FIG. 2 is a block diagram illustrating the wallet management feature of the present invention;

FIG. 4 is a block diagram illustrating a wallet gift refill feature of the present invention.

DETAILED DESCRIPTION OF THE INVENTION

Figure 1:
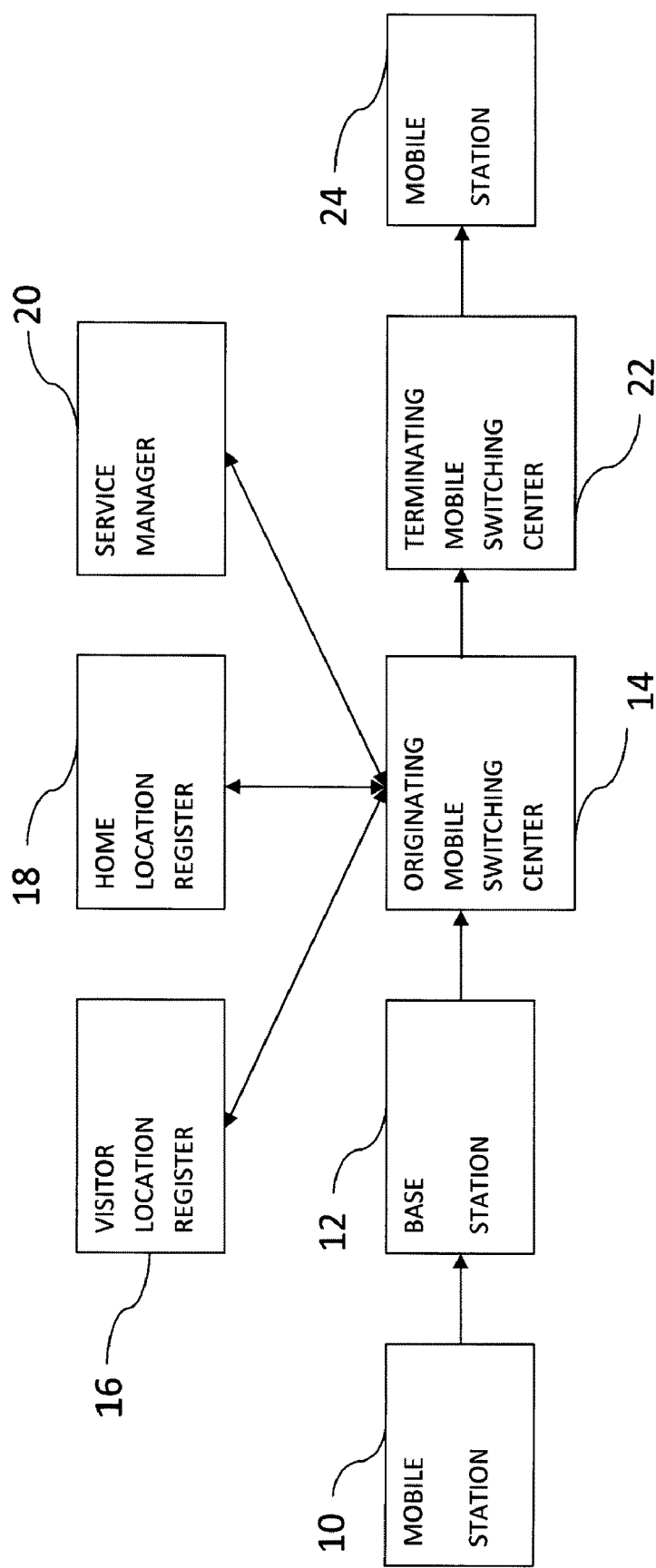
FIG. 1 is a flow chart illustrating, at a high-level, the process of initiating and permitting a service to be initiated in accordance with the present invention.

The present invention is directed to the real-time management of a device in general, and more particularly to the management of a phone by an administrator, such as a parent, guardian, financier, employer, supervisor, or responsible party, who can specifically control the functional use of the phone through management of the wallets associated with the phone. In the context of the present invention, a wallet is like an electronic account that has certain added features that accounts do not have and which can be used in additional ways that accounts are not used. A wallet can also be a singular item that includes a number of control features or a collection of items, each having their own control features, which operate in conjunction or cooperate with one another to achieve the same purpose as a singular item.

An account would typically include configuration settings for different services available to a user assigned to the account, would include a user's profile information, and would provide the user with the ability to manage the features that are activated for the account. Some of the features of a wallet that are added to an account include how money is entered into the wallet, who holds or has access to the wallet, the rules that apply to how each wallet can be used for different services, and the hierarchical use of the wallets for each service. Wallets also differ from accounts in that multiple wallets can be tied to a single device, such as a phone, a single wallet can be tied to multiple devices, and wallets can be completely dynamic, i.e., the wallet is not tied to any one device.

One aspect of the present invention is that it maintains the basic nature of a prepaid service by establishing a user wallet for a device, but adds the extra security of having one or more additional wallets also associated with that same device. These additional wallets can be set up to automatically cover the cost of specific services for the device or as back-up for the user wallet in the event it runs low on funds. If the user of a prepaid phone is a child that needs to call their mother, but the child's wallet is low on funds, the mother's wallet could be used to cover the cost of the call from the child to her. For even greater security, the mother's wallet could be backed by a credit card that automatically adds funds to the wallet when needed so there could be no possibility of the mother's wallet running out of money.

It should be noted that although the term "funds" is used herein to refer to the value stored in or charged to a wallet, an electronic wallet could also be used to store and spend almost any type of unit of value, whether money, credits, or some other indicator.

Returning to the example above, the wallets assigned to the child's phone could also be arranged so that calls with family members were always covered by the parent's wallets, but calls with the child's friends were always covered by the child's wallet. Other services, in addition to calls, such as downloads of games, wallpaper, ring tones, etc., or the sending and receiving of SMS text messages, could be allocated between the different wallets as well, with some services being paid by the parent, some services being paid by the child, or any other arrangement they prefer.

Requiring a child to pay for certain services can be a very effective way to help teach that child the difference between "want" versus "need," which tends to be much clearer to children when they are forced to buy something they "want," but do not "need," with their own money.

Of course, the organization and structure of wallets is not limited to just phones for children. Such wallets are effective tools for any phone user that requires some level of supervision, such as a handicapped individual, a person suffering from dementia, a corporate employee, or even an adult that has shown poor judgment in the past and requires help managing their affairs. Additionally, wallets could support a wide and various range of devices including communications, computing or game devices and a range of users and administrators including corporate sponsors, government agencies, schools, healthcare providers and employers. For example, a phone associated with a user wallet and an administrator wallet could be provided to an employee, such as a child care provider, that enabled the child care provider to only call or receive calls from a parent of the child being watched, and emergency services, but no one else. Alternatively, the phone could be set up without restrictions, but with multiple wallets that allocated out the expense of calls to the appropriate parties. For example, calls to and from parents could be managed so as to be paid by the parents, along with emergency calls and other such things, whereas all other calls, such personal calls by the child care provider, could be managed so as to be paid for out of the child care provider's wallet.

Additional wallets, such as promotional wallets established by the phone service provider, could be used to cover the cost of other services, for a specified period of time, for a specified number of services, or for any of numerous other purposes. Likewise, dynamic wallets could be established that could be used in association with any device and/or other wallets for any purpose, whenever the owner of the dynamic wallet so chooses.

With respect to any device/phone for which one or more wallets are established, there would be an administrator, such as a parent, employer, guardian, etc. The administrator would be responsible for establishing the rules or parameters under which the phone user's wallet could be used. If so desired, the administrator could establish an administrator's wallet that was tied to the same phone or multiple phones and establish additional rules or parameters under which the administrator's wallet could be used in place of or in conjunction with the user's wallet. As the administrator for one or more phone wallets, the administrator could also move money between different wallets. This would enable a family or company to manage their phone service budget in a manner that was not possible with a traditional bulk "shared plan," i.e., a 1000 minute/month voice bundle, where every user assigned to the plan had an equal ability to use the plan.

Before explaining wallets in greater detail, the manner in which wallets can be utilized in a telecommunications network will first be described. Although wallets could be implemented in any type of situation, a mobile telecommunications network is referenced in FIG. 1 as a particularly appropriate environment for the implementation of wallets. Wallets, however, could be associated with any type of device that is subject to use by someone other than the administrator and that can be in communication with an appropriate control network. This type of device is referenced herein as a communication device, not because the device is used for communication, but because it is capable of being in communication with the control network. Hence, the device could be a PDA, a photocopier, a game, a computer, a network device, a bicycle, or any type of device that one could imagine that is capable of being remotely controlled by logical rules. Also, the types of items that could be purchased or used by the device or ways in which the device can be controlled are only limited by the nature of the device. While a cellular phone is usually used to make phone calls, it can also be used for many other functions, including send and receive text messages, download and play games, music, movies, etc., and even make purchases of other objects or services that have nothing to do with the device, such as a gift at a shop, or a drink from a soda machine.

As illustrated in FIG. 1, the phone or mobile station 10, such as a cellular phone, smart phone, personal data assistant (PDA), or any other type of mobile computing platform, is utilized to originate a service, such as a call or message, using common standardized methods, e.g., as defined in IS-136 (a TDMA standard), IS-95 (a CDMA standard), etc. The phone/mobile station 10 would first establish a connection with a base station 12, which would in turn connect to an originating mobile switching center (O-MSC) 14. Upon receiving the origination request for a service from the base station 12, the O-MSC 14 would attempt to authenticate the mobile station 10 by querying a visitor location register 16 and a home location register 18 to determine if the mobile station 10 is registered with the telecommunications network and authorized for use on that network, collectively referred to as "validation."

Upon successful validation, the O-MSC 14 would trigger the service manager 20, based on standardized methods, e.g., as defined in IS-41, IS-771, IS-826, etc. The service manager 20 would first authenticate the subscriber of the mobile station 10 based on their mobile directory number (MDN) and/or their mobile subscriber identification (MSID), or some other type of identifier, as a valid subscriber. The term "subscriber" is used to generically define the person or entity that subscribed the phone to the telecommunications network, whether that happens to be the user or an administrator. If the subscriber is not valid, the subscriber will be notified through the mobile station 10 and the session will be terminated. If the subscriber is valid, the service manager 20 will then enforce the provisioned policies for the particular user of the mobile station 10, which includes, but is not limited to, wallet balance, wallet state/status, provisioned services, other functions or functional restrictions (such as contact restrictions, time-of-day restrictions or allowed number list functions/blocked number list restrictions), user selected service controls, etc. If the user fails any of the provisioned policies, the user will be notified and the session will be terminated. The provisioned policies are established by one or more global rules and/or one or more local rules, as further described below.

If the session is allowed to progress, the service manager 20 will then rate and charge the service transactions requested during that session. To do this, the service manager 20 again looks to the global level rules and the user level rules that have been established for the device in question. In addition to establishing the provisioned policies, the rules establish an order of precedence as to how the device/phone is to be administered and how authorized transactions are going to be charged. The global rules are checked first. If a service transaction requested can be categorized according to one of the global rules, the service transaction will be rated and charged according to the global rules. For example, the phone service provider could establish that any call to its customer support phone numbers will be allowed and should always be free to its users, in which case the user level rules would not apply.

The user level rules define how a user is to be rated and charged once it is determined that the global level rules do not apply to the service transaction request and/or payment. Additional rules can also be established that work in between the global rules and the user rules, such as promotional wallet rules and dynamic wallet rules. These additional rules can be integrated as follows: for each phone/mobile station, the service manager 20 has a variety of phone/mobile station wallets allocated to support multiple services and functions, such as a user wallet, and administrator wallet, and a promotional wallet. If the service transaction request has been authorized by the global rules, the service manager 20 would then check to see if the service transaction could be charged to another wallet.

For example, a promotional wallet could be established to discount certain transactions, or to provide rewards or credits for particular services, or to provide certain free transactions. If the promotional wallet applies and there is a sufficient balance in the promotional wallet, then the promotional wallet would be decremented (unless the promotional wallet was being incremented for use of a service instead). If the service transaction is not a promotional activity, the service manager 20 will apply other user level rules and either charge the user's wallet or the administrator's wallet. Dynamic wallets are further described below, but they would work in a similar fashion.

Whether a charge for a service transaction is taken from the user's wallet, the administrator's wallet, or some other wallet, depends on the user level (local) rules established by the administrator for that user. Hence, the administrator has the ability to specify unique service transactions as being charged to their wallet versus the user's wallet through use of unique identifiers for each service transaction (e.g., MDNs to be charged to the administrator's wallet for voice/SMS/MMS, content identifiers to be charged to the administrator's wallet, IM screen names to charged to the user's wallet, etc.). In the context of a pre-paid phone, a wallet would typically include a balance that corresponds to some amount of United States Dollars deposited with the service provider. In other contexts, as noted above, a wallet could be designed to hold any unit of value in place of dollars, including other currency types, service units, assets, or even something completely made up that only has value in some limited context, like virtual money in a multiplayer, on-line, role playing game.

Once the service transaction has been rated and charged, the service transaction is permitted to continue. If the service transaction is a call, a download, a text message or any other service that requires the user's phone/mobile station 10 to be connected to another mobile station or device connected to a mobile station, a connection would be established to the terminating mobile switching center (T-MSC) 22 and then connected to the mobile station 24, assuming mobile station 24 or the device connected to it is available and the service transaction can be completed.

Wallets can be set up and administered in a number of different ways. For example, in the pre-paid cell phone context, the administrator and user could sit down together at a computer connected to a website associated with the service provider of the phone and view and/or edit wallet settings for that user's phone. The administrator could also call the service provider and administer the user wallet and administrator wallet over the phone. While the user wallet is generally going to be associated with the device being used, which itself will have some form of unique identifier, the administrator wallet will not necessarily be tied to just the one device. Hence, the administrator wallet, like any of the other wallets that could be established (promotional, dynamic) just needs to have a unique identifier that could be used to associate the administrator wallet with each of the devices it will be managing.

An example of a system for managing a number of user wallets from within a single administrator wallet, in accordance with a preferred embodiment of the present invention, is illustrated in FIG. 2. The Contact Manager 30 generally illustrated in FIG. 2 is in the form of a webpage on a website that enables an administrator to manage one or more wallets associated with that administrator and/or multiple users. The Contact Manager 30 can also be used by the users to manage their user wallets in a similar fashion. Since the Contact Manager 30 illustrated in FIG. 2 is a webpage, underlined text indicates hypertext or hyperlinks that can be selected with a pointing device to go to other webpages or even other websites.

As shown in FIG. 2, Daniel is the administrator, as indicated in area 32 and has administrative rights over three shown users, Eleanor, Ryan and Steve, and an unspecified number of additional users. The wallet summaries for Eleanor, Ryan, and Steve are shown in the Account Overview area 34. The additional user wallets would be visible if the "See all accounts" option, located below area 34, was chosen.

Daniel is shown to have a balance of $70.53 USD in his administrator wallet shown in area 32. Eleanor's name, phone number, and a balance of $0 USD in her wallet, are shown in the upper part of Account Overview area 34. Likewise, Ryan's and Steve's names, phone numbers, and wallet balances are also shown in area 34. Both Ryan and Steve have positive cash balances in their wallets. Because Eleanor has a zero balance, she also has a low balance alert shown below her wallet summary to alert Daniel. As Eleanor has a zero balance, she cannot initiate a service unless Daniel has indicated that he would be willing to pay for the service from his wallet or has authorized some other wallet to apply to any service transaction desired by Eleanor.

Based on this alert, Daniel is presented with the options of informing Eleanor to add money to her wallet or adding money to Eleanor's wallet on his own. Although many different methods of refilling a wallet could be provided, the two options shown are to refill Eleanor's wallet now or to set up an automatic refill for Eleanor's wallet. The refill and auto-refill options are further discussed with respect to FIG. 3 below. The low balance alerts could also be set at different levels other than zero. The administrator or the user could set the low balance level for a wallet at $5 USD or $10 USD, or set multiple low balance alerts that are each treated the same or in different ways. For example, a first alert could be sent only to the user, such as through an email, a text message, or in some other manner, while a second lower balance level alert was sent only to the administrator.

The Contact Manager 30 serves a number of purposes, including: (1) to enable the administrator to manage all of the wallets associated with that administrator; (2) to establish certain general rules that control device functions and payment; and (3) to establish certain local rules that control device function and payment. As shown in FIG. 2, Daniel has chosen to manage Steve's wallet. The arrow 35 next to Steve's name would activate a drop down menu that would enable Daniel to select a different user wallet to manage, such as Eleanor's wallet or Ryan's wallet. Since Steve's wallet has been selected, Steve's Contacts are illustrated in the local rules area 36. The global rules associated with Steve's wallet are illustrated in the global rules area 38.

The Contact Manager 30 could be configured to enable Daniel to manage many additional or different services or functions (downloads, etc.) for Steve in the same manner as calls and text messages are illustrated in areas 36 and 38. For example, in addition to indicating the names and numbers of people that Steve can or cannot communicate with by calls or text, referred to herein as allowed number lists/blocked number lists or contact management function, the Contact Manager 30 could also be configured to enable Daniel to select the features or functions of Steve's phone that Steve could use, such as the ability to use the wallet to pay for physical goods at a store using the phone, i.e., a feature management function, or the time of day during which the phone could be used in general or for specific purposes (e.g., okay to call Jeff, but only between 3 pm and 6 pm), i.e., a time management function.

As used herein, the term blocked number list refers to a list of phone numbers that have been blocked, both in terms of sending calls/texts to Steve's phone and receiving calls/texts from Steve's phone. The term allowed number list refers to a list of phone numbers that have been permitted, both in terms of sending calls/texts to Steve's phone and receiving calls/texts from Steve's phone.

Although many different functions associated with Steve's phone could be managed through Daniel's wallet, in order to more clearly illustrate how the Contact Manager 30 would be used to manage Steve's wallet, FIG. 2 only illustrates one function, the contact management function. The additional functions, such as feature management and time management would be similarly structured and could be shown as part of the Contact Manager 30, or as separate management functions on other web pages. In addition to managing a specific function within a function manager, it is also possible to override functional controls within one function manager from within another function manager. This point is further described below with respect to the "Override Restrictions" feature 40 of the Contact Manager 30.

The local rules established for Steve in local rules area 36 include the contact and payment rules associated with three specific people and their phone numbers and the general category of "All Other Numbers." For each contact, Daniel can decide to either allow calls/texts to the contact, or to block such calls/texts, by clicking on the circular radio buttons illustrated in area 36. When a radio button has been selected or clicked, the central area of the radio button is darkened. When the radio button has not been selected, the central area is clear. Daniel can also specify whose wallet will be used to pay for any such calls/texts.

As illustrated, calls/texts to Jack are allowed and are to be paid for out of Daniel's wallet. Since Daniel is the administrator of Steve, Daniel's wallet is referred to as the "Admin Wallet." Different language, other than "Admin Wallet," could obviously be used in different contexts. For example, if Daniel was Steve's parent, Daniel's wallet could be referred to as a parent wallet. If Daniel was an employer and Steve an employee, Daniel's wallet could have a different name, etc. Since Daniel has indicated he would pay for any call to or from Jack and Steve, even if Steve had no money is his wallet, Jack and Steve would still be allowed to communicate and the charges would be charged to Daniel's wallet.

While calls/texts with Jeff are also permitted, they are to be paid for by Steve out of his wallet, since Steve's wallet has been selected. If Steve runs out of money in his wallet, however, he would no longer be able to communicate with Jeff until Steve refilled his wallet because neither the Admin wallet nor Grandma's wallet has also been selected. It should be noted therefore that the wallets are not mutually exclusive. Hence, with respect to Jeff, both Steve and Grandma's wallet could be selected at the same time, or even all three wallets (Admin, Steve and Grandma) could be simultaneously selected. In such a case, additional local rules would be used to establish an order of precedence between each of the wallets. For example, calls with Jeff would first be paid for by Steve, but when Steve ran out of money, Grandma would cover the cost of such calls, either for a limited amount of money, for a limited amount of time, or until Grandma ran out of money as well, in which case the Admin wallet would be charged. Many other orders of precedence could obviously be established.

With respect to Jane, any call or texts are permitted and will be paid for out of Grandma's wallet. In this case, Grandma's wallet is a dynamic wallet that is associated with Steve's wallet and Steve's device, but is not controlled by Grandma. Grandma has set up a wallet, put funds in it and indicated to Daniel that her wallet can be used by Steve for the specific purpose of calling Jane. Grandma's wallet could also be associated with any of a number of different administrators, and different users, for different purposes and functions with respect to each user. In this case, Grandma's wallet only has a unique identifier that enables it to be associated with other wallets as she so directs, but is not associated with any particular device, per se. Grandma's wallet could also just be associated with Steve's wallet or even the Admin wallet without any specific function associated with it. Thus, Steve and the Admin could use the funds in Grandma's wallet, as determined by the Admin, for any purpose they might choose.

Also shown in FIG. 2 is the name of "All Other Numbers." Because the "No" choice was selected for "All Other Numbers," no calls/texts to or from any numbers other than those shown in the local rules area 36 are permitted by the local rules. Since no communication is permitted with numbers other than Jack, Jeff and Jane, there is no need to designate whose wallet would be charged for such communication. FIG. 2 further illustrates an "Override Restrictions" function 40, which serves as a local rule that can be used to override any restrictions on functions applicable to Steve, such as a time of day restriction. An override restriction could be set up to be very narrow or very broad. As illustrated in FIG. 2, the override restriction is unspecified, so it could apply to only a narrow set of functional restrictions established by other local rules on web pages not shown herein, or to any other functional restrictions that could have been established.

The Override Restrictions feature 40 can be useful for parents that want to restrict generally when a child can use a phone, except with respect to communication with certain people. For example, if Jack was a child care provider for Steve, Daniel would want Steve to be able to contact Jack at any time, and vice versa, even if Steve was not otherwise allowed to use his phone between 9 am and 3 pm, i.e., during school hours. The ability to regulate when a phone can be and cannot be used can also be of value to parents and school districts with respect to resolving one of the greatest conflicts that exist between parents/students and school administrators—mobile phone usage by kids. Parents want children to have a mobile phone with them so the child can call the parent if need be, i.e., if someone forgets to pick the child up after school. School districts do not want the children to have the phones at all because the students tend to misuse the phones, i.e., to call friends during school, to cheat, to engage in illegal activity, etc. While the school districts believe that children should be relegated to only using the school phones if the children need to contact a parent, the parents want the children to have the phones with them in case they get locked out of the school, get lost on a field trip, etc.

The override restrictions feature 40 can be used in many other contexts as well and is not limited to just overriding a restriction on time of day usage, which could be the manner in which this function is used with respect to FIG. 2. Basically, any restriction that might be in place due to a local rule could be set up to be overridden. If another local rule was established to regulate the downloading of some game, or the use of some other features/functions, or the use of the device in some other context, activation of the override restrictions function would cause that local rule restriction to be bypassed until the override restrictions function was deactivated.

As illustrated in FIG. 2, only Daniel is permitted to manage Steve's phone, but Steve's phone could also be set up to be managed by Steve's school as well. For example, Daniel could register with a mobile phone service through the school that permits Steve to have his phone with him at school, rather than in a locker, but which tightly controls how the phone can be used during school hours. For example, only certain functions or features could be enabled during school hours so the phone could not be used to cheat, or to play games, or to call/text other students, but the phone could be used to call a parent or certain other people that were permitted to be called. If Steve's phone had some form of location feature associated with it, i.e., a feature that enabled the phone's location to be roughly estimated, the school controls function could be set to only be operational when Steve's phone was on school property. In this manner, if Steve had to walk home, or was on a field trip, the phone would still work as permitted by Daniel, even if the school had other limiting control on Steve's phone at that time.

Area 42 includes additional functions that enable changes to area 36 and 38 to be saved, or for new contacts to be added.

Obviously, the local rules could be much more extensive than as illustrated in the local rules area 36 of FIG. 2, which is also true with respect to the global rules shown in global rules area 38. As illustrated in FIG. 2, only three global rules are illustrated: (1) 911 calls are allowed and are always free; (2) Customer Care Calls are always allowed and are free; and (3) 900-number Calls are not allowed. Since these are global rules, even though the local rules do not allow calls and texts to or from numbers other than those contacts listed in Steve's contact, calls to 911 and to Customer Care Calls would be permitted despite the local rules. In the same context, even if the local rules permitted calls to other numbers, by selecting a global rule blocking 900-number calls, the global rule applies first and the local rules are not considered.

Although the administrator wallet would typically be arranged to cover zero balances in the user's wallet, this arrangement could be reversed under certain circumstances. For example, if a service was designated as being paid from the administrator's wallet, but the administrator's wallet had a zero balance, rather than block the service, the payment could be set to revert back to being paid by the user's wallet, or another wallet (Grandma's wallet) as described above. This type of arrangement ensures maximum security for both the administrator and the user with respect to important services, provided any of the other wallets have money in them.

In addition to paying for certain services, the administrator can choose to move funds or units of value, such as airtime and service units, between wallets. For example, the administrator could manually transfer $10 USD from the administrator's wallet to the user's wallet at any time, or the administrator could set up an automatic transfer of specified amounts at specified times. In the context of a parent administrator and a child user, a transfer of money from the administrator's wallet to the phone user's wallet could be structured to mirror a real-world "allowance." The administrator could also move funds/units between different user wallets or even permit or control how different users "trade" funds/units between their wallets. For example, two employees might trade funds between their wallets or two children might trade electronic toys, merchandise, phone usage units, or funds for their phones through their wallets.

Figure 3:
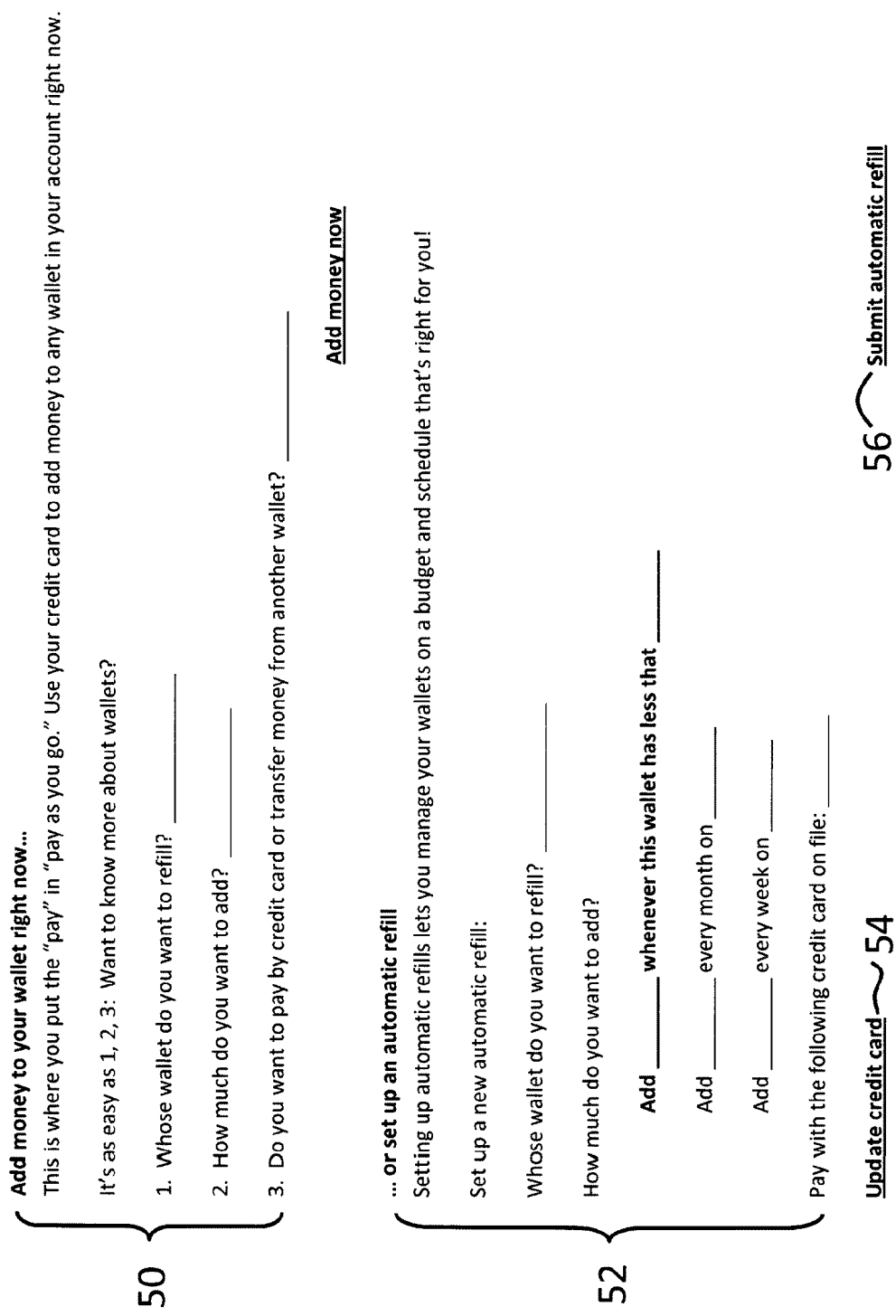
FIG. 3 is a diagram illustrating the wallet refill and auto-refill features of the present invention.

Two methods of refilling a wallet are illustrated in FIG. 3. The manual refill area 50 allows the administrator/user to decide whose wallet is going to be refilled, how much is to be added, and the method of payment, such as a credit card or a transfer of money/units from another wallet. Transfers could be paid for and arranged in other ways as well, including the transfer of funds from a phone or device on another network. For example, if someone had the phone number of a user, funds could be transferred to the user's wallet by accessing a website (as shown in FIG. 4 below) or calling customer service to enable the fund transfer. Funds could also be transferred from a person's cell phone to a wallet by charging the amount of the cost of the transfer to that person's cell phone bill, like mobile-commerce (M-commerce) payments or other forms of micropayments. The automatic-refill area 52 likewise allows the administrator/user to select a wallet and to automatically add funds/units to the wallet when the wallet gets to a certain balance level, or every month at a specified time, or every week on a specified day. Automatic-refills could be paid in all of the different ways in which manual refills are paid. If the credit card to be charged needs to be added or changed, the hypertext 54 would be selected. If the person making the refill was happy with what they had entered, the hypertext 56 would be selected.

FIG. 4 illustrates a gift refill webpage that would enable any person to add funds to a user's wallet as a gift. As shown in the gift refill area 60, as long as the person using the webpage knows the phone number of the phone associated with the user's wallet, that person could add a gift amount, tell the user who made the gift to them, and even send the user a message. Payment area 62 enables anyone wishing to make a gift of a wallet refill to register and provide payment information (a credit card is shown, but a wallet transfer or some other method of payment could also be used) to pay for the refill and for future use.

As previously noted, a service provider could also establish promotional wallets or enable dynamic wallets. Although the global rules and local rules determine the interaction between user wallets and administrator wallets, as additional types of wallets are added, a hierarchy between the wallets would be required to ensure that requested services were taken from the most appropriate wallet first. Under this hierarchy, before the global or local rules were checked to determine which wallet was designated by the administrator to pay for a service, the promotional wallet would be checked to determine if the service would be covered by the promotional wallet. For example, if a promotion involved giving 10 free voice minutes to a user, those 10 minutes would be placed in a "voice" promotional wallet that would then be used first before determining whether additional minutes would be taken from the user's wallet or the administrator's wallet.

However, the global and local rules would still need to be checked to make sure that the service was permitted. This prevents a promotional wallet from being used to call a 900-number when calls to 900-numbers would otherwise be blocked by the global rules.

As discussed above with respect to Grandma's wallet in FIG. 2, a dynamic wallet would be a wallet that was set up by someone, like a grandparent, but that was not necessarily tied to any particular user or device/phone number. Like the other types of wallets, a dynamic wallet could be filled with funds or units and used to enable a variety of services for a number of other users or the user of the dynamic wallet by either being associated with one or more devices or one or more wallets. To prevent conflicts with an administrator's wallet or a user's wallet, a dynamic wallet would not be able to authorize services for a user that were blocked by the administrator, but could pay for those services that were allowed. A dynamic wallet could also be configured to take precedence over a promotional wallet or even a user's wallet with respect to paying for services, or could simply be used as an additional backup wallet in the unlikely event all of the other wallets for a phone were not available, as previously described.

Although the wallets described herein are described in the context of being used with a mobile device, particularly a pre-paid cellular phone, wallets could be associated with any type of communication device, as described above. Some of the key features of wallets in the context of the present invention are: (1) that they enable real-time management or control of a device; (2) that each device requires at least two wallets to be associated with it, at least one user wallet and at least one administrator wallet; (3) that an order of precedence can be established between the wallets, as to which wallet pays for what, and any wallet can be used to back up a payment by a second wallet in the event the second wallet is low on funds/credits; and (4) that local rules and global rules can be established for the wallets that enable the administrator to manage the functions of a device in many different ways, including who can be contacted, what transactions are permitted, what time of day the device can be used, what features or functions are enabled, etc. Global rules and local rules can be applied in order, so as to result in two separate decisions, or at the same time as a single decision (e.g., if local rule X is true and global rule Y is true, then allow the function to proceed).

Hence, the present invention, while illustrated and described in terms of a preferred embodiment and several alternatives herein in association with the various drawing figures, should not be limited to just the particular description contained in this specification. Additional alternative or equivalent components and steps could be used to practice the present invention.

What is claimed is:

1. A system for managing in real-time a communication device used by a user, comprising:
   a user wallet for electronically storing units of value, the user wallet being accessible by the user and being associated with the communication device;
   an administrator wallet for electronically storing units of value and being associated with at least the communication device, the administrator wallet being accessible by an administrator; and
   a function manager for managing a function of the communication device in real-time, the function manager having a global rule that specifies whether the function is permitted and a local rule that applies if the function is permitted by the global rule and that specifies whether a number of units of value associated with the function will be charged to the user wallet or the administrator wallet.

2. The system as recited in claim 1, wherein the communication device is a mobile device.

3. The system as recited in claim 1, wherein the local rule specifies that the administrator wallet is to be charged for the function if the user wallet lacks sufficient units of value to pay for the function.

4. The system as recited in claim 1, wherein the local rule specifies that even if the administrator wallet is to be charged for the function, if the administrator wallet lacks sufficient units of value to pay for the function, then the user wallet is to be charged for the function if the user wallet contains sufficient units of value to pay for the function.

5. The system as recited in claim 1, wherein the administrator wallet is associated with a charge card, and wherein the charge card is charged if the administrator wallet lacks sufficient units of value to pay for the function.

6. The system as recited in claim 1, wherein the units of value are credits representing services or applications.

7. The system as recited in claim 1, wherein the local rule specifies that charges associated with sending or receiving content between the communication device and the administrator are charged to the administrator wallet.

8. The system as recited in claim 1, wherein the local rule specifies a list of names or numbers corresponding to other communication devices or persons, and wherein the local rule specifies that charges associated with sending or receiving content between the communication device and the other communication devices or persons on the list are to be charged to the user wallet.

9. The system as recited in claim 1, wherein the local rule specifies a list of names or numbers corresponding to other communication devices or persons, and wherein the local rule specifies that charges associated with sending or receiving content between the communication device and the other communication devices or persons on the list are to be charged to the administrator wallet.

10. The system as recited in claim 1, further comprising a promotional wallet for storing units of value and being associated with the communication device, wherein the global rule specifies one or more promotional functions that can be charged to the promotional wallet, and wherein the local rule specifies that if sufficient units of value are stored in the promotional wallet, then charges associated with the promotional functions are to be charged to the promotional wallet.

11. The system as recited in claim 1, wherein if the units of value stored in the user wallet equal or pass a level specified by the administrator, the administrator and/or the user is alerted.

12. The system as recited in claim 11, wherein the user wallet is associated with a charge card, and wherein the charge card is charged a pre-specified amount if the units of value stored in the user wallet equal or pass the level.

13. The system as recited in claim 1, wherein the function manager includes a plurality of global rules and one or more of the plurality of global rules are predetermined and cannot be changed by the administrator or the user.

14. The system as recited in claim 1, wherein the function manager is accessible by the administrator through a website that enables the administrator to choose the function and to choose a first global rule and/or a first local rule.

15. The system as recited in claim 14, wherein the first local rule specifies that if the units of value stored in the user wallet equal or pass a level specified by the administrator, the function manager will provide an alert to the administrator.

16. The system as recited in claim 14, wherein the administrator wallet is associated with the communication device and a plurality of additional communication devices used by a plurality of additional users, and wherein the function manager enables the administrator to choose the user or one of the plurality of additional users to administer.

17. The system as recited in claim 1, further comprising a support service for assisting the administrator and/or the user in using the function manager.

18. The system as recited in claim 1, further comprising a transfer function for enabling the administrator to make a transfer of units of value between the administrator wallet and the user wallet.

19. The system as recited in claim 18, wherein the transfer function automatically makes the transfer of a predetermined number of units of value to the user wallet from the administrator wallet on a periodic schedule.

20. The system as recited in claim 1, further comprising a third party wallet and a transfer function for enabling the user to make a transfer of units of value from the user wallet to the third party wallet.

21. The system as recited in claim 20, wherein the transfer of units of value is used to pay for communication services.

22. The system as recited in claim 20, wherein the transfer or units of value is used to pay for a previously purchased product or service.

23. The system as recited in claim 20, wherein the transfer or units of value is used to make a payment for a purchase of a product or a service.

24. The system as recited in claim 1, further comprising a gift function for enabling a third party to make a deposit of units of value to either the user wallet or the administrator wallet.

25. The system as recited in claim 24, wherein the gift function further enables the third party to communicate with the user and/or the administrator regarding the deposit.

26. The system as recited in claim 24, wherein the gift function further enables the third party to make a transfer of units of value from an other communication device to either the user wallet or the administrator wallet and to have a charge associated with the transfer added to a bill associated with the other communication device.

27. The system as recited in claim 1, further comprising a support service for assisting a third party in making a deposit of units of value to either the user wallet or the administrator wallet.

28. The system as recited in claim 27, wherein the deposit results in a charge associated with the deposit being added to a bill associated with a third party communication device associated with the third party.

29. The system as recited in claim 27, wherein the support service further assists the third party in communicating with the user and/or the administrator regarding the deposit.

30. The system as recited in claim 1, further comprising a transfer function for enabling the administrator to automatically make a transfer of units of value, up to a predetermined maximum level, to the user wallet when the units of value stored in the user wallet equal or pass a predetermined level.

31. The system as recited in claim 1, further comprising a refill function for enabling the administrator to make a deposit of units of value to the user wallet on a periodic basis up to a predetermined maximum level.

32. A system for funding in real-time one or more communication devices, comprising:
- a dynamic wallet for electronically storing units of value, the dynamic wallet being accessible by a financier and being represented by a unique identifier;
- one or more user wallets for electronically storing units of value, the user wallets being associated with the communication devices;
- a function manager for managing a function of the communication devices in real-time, the function manager having at least one global rule that specifies whether the function is permitted and at least one local rule that applies if the function is permitted by the global rule and that specifies whether a number of units of value associated with the function will be charged to the user wallet or to the dynamic wallet;
- an administrator wallet for electronically storing units of value and being associated with the communication devices, the administrator wallet being accessible by an administrator; and
- a funding manager accessible by the financier that enables the financier to associate the dynamic wallet with the communication devices and to transfer units of value from the dynamic wallet to the administrator wallet or the user wallets.

* * * * *